(12) United States Patent
Deville et al.

(10) Patent No.: US 9,140,618 B2
(45) Date of Patent: Sep. 22, 2015

(54) MEMBRANE FOR OIL COMPENSATION

(75) Inventors: Benoit Deville, Saint-Germain-en-Laye (FR); Frederic Pauchet, Montigny sur Loing (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 905 days.

(21) Appl. No.: 13/266,114

(22) PCT Filed: Jun. 1, 2010

(86) PCT No.: PCT/US2010/036845
§ 371 (c)(1),
(2), (4) Date: Jan. 19, 2012

(87) PCT Pub. No.: WO2010/138961
PCT Pub. Date: Dec. 2, 2010

(65) Prior Publication Data
US 2012/0111437 A1    May 10, 2012

Related U.S. Application Data

(60) Provisional application No. 61/182,120, filed on May 29, 2009.

(51) Int. Cl.
*G01L 7/08* (2006.01)
*E21B 47/01* (2012.01)
*E21B 47/06* (2012.01)

(52) U.S. Cl.
CPC ............... *G01L 7/082* (2013.01); *E21B 47/011* (2013.01); *E21B 47/06* (2013.01)

(58) Field of Classification Search
None
See application file for complete search history.

(56) References Cited

U.S. PATENT DOCUMENTS

| | | | | |
|---|---|---|---|---|
| 5,999,082 | A * | 12/1999 | Kurtz et al. | 338/42 |
| 6,588,209 | B2 * | 7/2003 | Kleibrink | 60/591 |
| 7,859,681 | B2 * | 12/2010 | Moroni et al. | 356/482 |
| 2002/0135456 | A1 | 9/2002 | Kurtz | |
| 2004/0154390 | A1 | 8/2004 | Baustad | |
| 2007/0095145 | A1 | 5/2007 | Sato | |
| 2009/0085701 | A1 | 4/2009 | Veneruso | |

FOREIGN PATENT DOCUMENTS

EP    1903181    3/2008

* cited by examiner

*Primary Examiner* — Andre Allen
(74) *Attorney, Agent, or Firm* — Stephanie Chi; Jody DeStefanis

(57) ABSTRACT

A membrane to compensate for effects on a volume of oil, the membrane is a metal capable of an elastic deformation and having a shape selected to optimize the elastic deformation in a desired manner so as to compensate for the effects on the volume of oil.

10 Claims, 4 Drawing Sheets

(a)

(b)

With $n = \left\lfloor 2 + \dfrac{Y}{10 \cdot A} \right\rfloor$ = waves number

MEMBRANE FOR OIL COMPENSATION

BACKGROUND OF THE INVENTION

1. Field of the Invention

This invention relates to a membrane in general, and in particularly but not exclusively, to a membrane able to compensate for downhole effects on a volume of oil.

2. Description of the Known Prior Art

In downhole tools such as logging or drilling tools used for hydrocarbon exploration and production, it is a typical part of the tool design to have a pad that is aligned adjacent a wall of the borehole. The pad is equipped with sensors that scan the formation in the borehole wall. However, the pad itself is exposed to huge large pressures and temperatures downhole.

Thus, in formation evaluation, pad tools always face the same issue, which is they the inability withstand the absolute pressure. As such, the pads are filled with oil and compensated for by the oil expansion in temperature and shrinkage in pressure.

Today solutions for compensation systems are piston compensations, rubber membranes and metallic bellows. All those solutions encounter failures: piston tend to gall, rubber membranes are permeable to gas and bellows trap mud that block any movement resulting in mud entry into the pad. Some metal plates have sometimes been used but only to compensate for very small volumes.

It is therefore desirable to have a metal membrane that will overcomes these issues and compensates for large oil volumes.

BRIEF SUMMARY OF THE INVENTION

According to a first aspect of the present invention there is provided a membrane to compensate for effects on a volume of oil, the membrane is a metal capable of an elastic deformation and having a shape selected to optimize the elastic deformation in a desired manner so as to compensate for the effects on the volume of oil.

Preferably wherein the effects are pressure and temperate experienced in a downhole environment and cause the cause the volume of oil to expand or contract.

The metal also a high yield strength and is easily formable. The metal is at least one of copper, titanium, nickel, iron, cobalt, zitcoconium and an alloy containing at least of the said metals as a main constituent. The shape is selected to maximize a surface area of membrane. The surface area is obtained from a width and a length parameter of the membrane, and wherein the shape is further selected such that the length and width parameters are of substantially the same order of magnitude. The shape is selected to only have flexion constraints in its cross section when differential pressure is applied. The volume of oil is stored in a pad of a downhole tool. The pad having sensors located therein and surrounded by the volume of oil.

These together with other aspects, features, and advantages of the present invention, along with the various features of novelty, which characterize the invention, are pointed out with particularity in the claims annexed to and forming a part of this disclosure. The above aspects and advantages are neither exhaustive nor individually or jointly critical to the spirit or practice of the invention. Other aspects, features, and advantages of the invention will become readily apparent to those skilled in the art from the following detailed description in combination with the accompanying drawings, illustrating, by way of example, the principles of the invention. Accordingly, the drawings and description are to be regarded as illustrative in nature, and not restrictive.

BRIEF DESCRIPTION OF THE SEVERAL VIEWS OF THE DRAWINGS

The invention will be better understood and aspects other than those set forth above will become apparent when consideration is given to the following detailed description thereof. Such description of the present invention is illustrated by way of example, and not by way of limitation, to the annexed pictorial illustrations, graphs, drawings, and appendices, in which like reference numerals refer to similar elements.

DETAILED DESCRIPTION OF THE INVENTION

Various implementations and aspects of the invention will now be described in detail with reference to the accompanying figures. Still other aspects, features, and advantages of the present invention are readily apparent from the entire description thereof, including the figures, which illustrates a number of exemplary embodiments and implementations. The invention is also capable of other and different implementations, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Formation Evaluation tools face pressures of up to 35 KPsi. At the pad, sensors can usually not withstand such pressure, so they are filled with silicon oil and pressure compensated to have the same pressure inside and outside the tool.

The metal membrane of the preferred embodiment tries to compensate for oil expansion in temperature and oil shrinkage in pressure, while still being a good barrier for gas entry, unlike elastomeric or plastic membranes.

Figure 1:
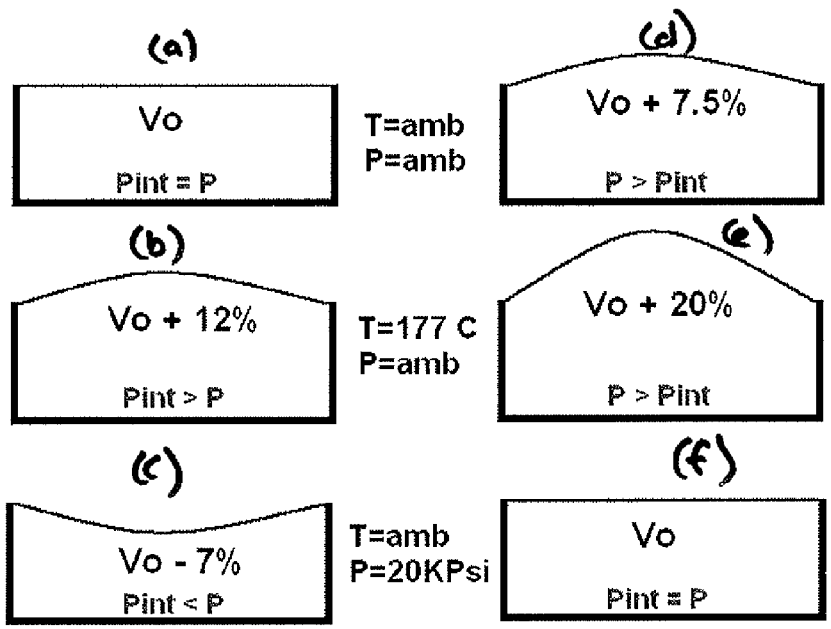
FIG. 1 shows two operating principles for oil compensation membranes.

FIG. 1 shows two examples illustrating the principles of oil compensation membranes. On the left is show a membrane resting at ambient conditions and allows expansion when temperature increases and shrinkage when pressure increases. On the right, the membrane is tensed which allows for a larger expansion in temperature, but comes back to rest when pressure only is applied. In both cases the pressure differential between the inside and outside of the pad is only due to the elasticity of the membrane.

The issue is that the metal is a hundred times stiffer than plastic and more than ten thousand times stiffer than elastomer compounds. Counting only on the elasticity of metal to compensate for 25% of volume deformation is just impossible, even with highly elastic metals. The idea is to create optimize shape and use specific metal properties in forming to allow for large deformations.

According to a preferred embodiment of the invention, improved membrane compensation for oil volumes is improved by:
- selecting a metal with high yield strength and quite easily formable. Such a metal or alloy may be chosen from alloys containing as main constituent but not limited to: copper, titanium, nickel, iron, cobalt, zirconium; and
- creating special shapes, or corrugations on the surface to allow the membrane to work in pure flexion.

Figure 2:
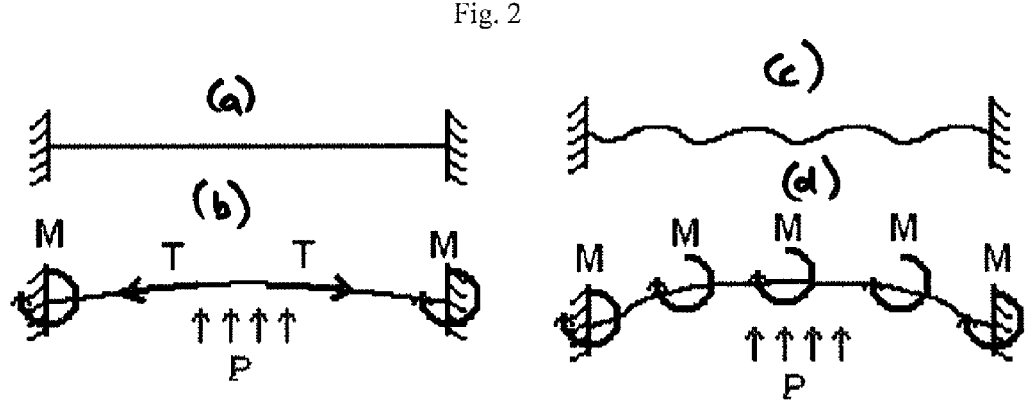
FIG. 2 shows a comparison of flat membrane and a corrugated membrane according to an embodiment of the invention.

As the metal does not elastically deform enough to allow for large deflections, the idea is to create corrugations to have the membrane work in pure flexion as shown by FIG. 2. The selected shape is optimized to allow the membrane to deform in a desired manner.

Specifically, on the left, FIGS. 2a and 2b show a flat membrane, which when submitted to differential pressure will cause a flexion stress to be applied at the attached points, but also tensile stress along the whole surface caused by its stretching. The deformation is low for low elastic materials like metals that cannot stretch that easily.

On the right, FIGS. 2c and 2d show a corrugated membrane submitted to the same differential pressure, which will cause essentially the same flexion stress at the attached points. However the tensile stress is no longer such a limiting factor, and due to the corrugations the deformation can be larger thus allowing for large volume compensation.

Thus, not only can downhole exploration pad tools be made from metallic membranes to replace elastomeric membrane to increase the reliability, but these metallic membranes can be shaped to offer more flexibility for large volume oil compensation.

The design of the shape of the membrane can take on many forms.

In one embodiment, the thickness of the membrane is optimized. Specifically, the lower the thickness of the membrane, the lower is the quadratic moment and, therefore, the higher is the deformation in flexion in the elastic domain.

Figure 7:
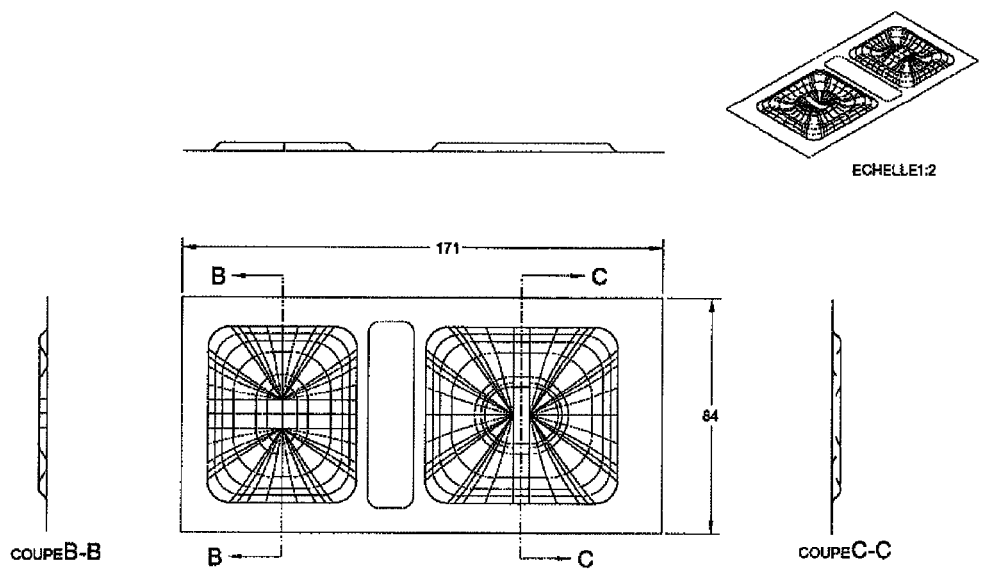
FIG. 7 shows the shape of the membrane according to a first tool embodiment of the present invention.
Figure 8:
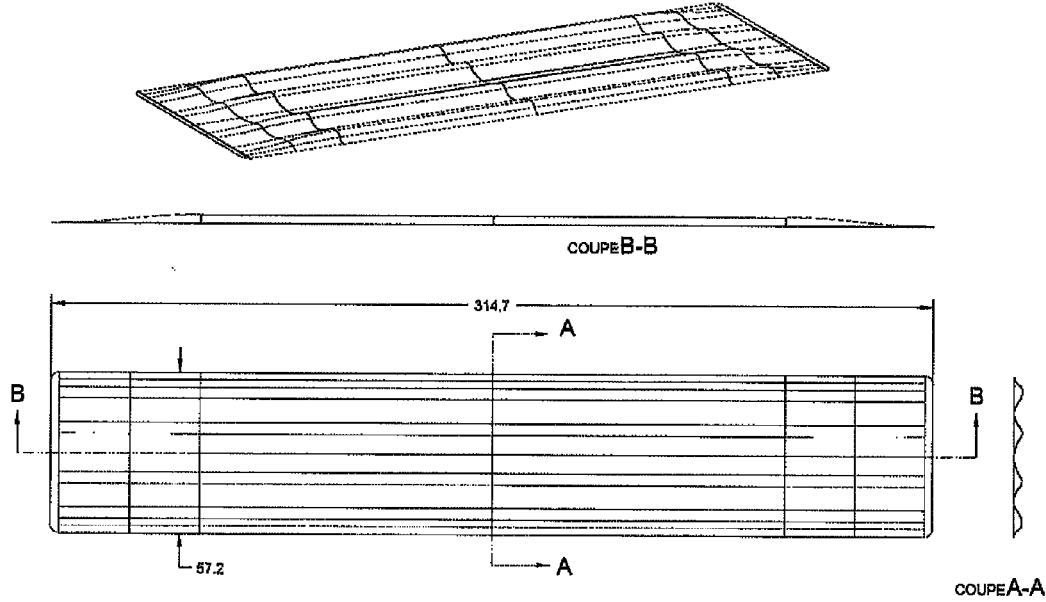
FIG. 8 shows the shape of the membrane according to a second tool embodiment of the present invention.

FIG. 7 shows a first application shaped according to a first design referred to as TOOL 1, whereas FIG. 8 shows a second application shaped according to a second design referred to as TOOL 2. In both TOOL 1 and TOOL 2, where robustness of design is an issue, going below 0.1 mm was risky and therefore, a 0.1 mm sheet of alloy at the appropriate cold work rate (to be formable and get high mechanical characteristics) was picked to manufacture the membrane.

Nevertheless, the membrane design with corrugations principle design can be applied to a wide range of thicknesses.

In another embodiment, the surface area of the membrane is optimized. To obtain large volume compensation, two parameters are needed: a large vertical deflection and a large surface area. The surface area available for the compensating membrane will have to be as large as possible. Thus, the width of the membrane may be important in such an embodiment, since a membrane with width and length of the same order will allow for more deformation as compared to a membrane whose length and widths are disproportionate.

The deflection, on the other hand, is the result of the material properties (of the metal or alloy) and of the shape (i.e. corrugated) design. Indeed a performance factor may be defined as an average deflection equal to:

$$MeanDeflection = \frac{VolumeCompensated}{MembraneArea}$$

In a preferred embodiment, the design of the corrugated shape allows for large deformation of the membrane in the elastic domain. The shape should allow the membrane to only have flexion constraints in its cross section when differential pressure is applied. FIG. 2 reinforces this by showing the waves adding length to the membrane, which will deform under flexion constraints, whereas a flat membrane will need to highly deform in tension to obtain the same volume displacement.

Figure 3:
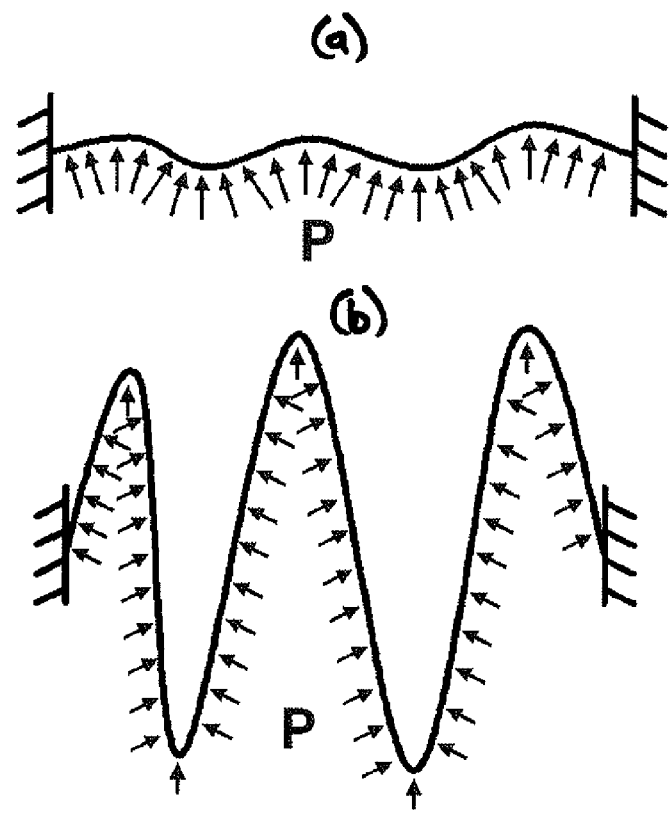
FIG. 3 shows a comparison of small and large corrugated membranes according to an embodiment of the invention.

There are a number of aspects involved in deformation of membranes according to an embodiment of the invention. These aspects will be discussed by way of the examples shown in FIGS. 3 and 4.

Firstly, a beam with small corrugations will deflect more easily than a beam with large corrugations under the same constraints, because the load is mostly normal to the beam main direction and parallel to the desired beam movement, meaning to the top. Specifically, FIG. 3a shows a beam with small corrugations (low waves) in which pressure is applied mainly in the direction of the desired movement, i.e. upwards. FIG. 3b shows a beam having large corrugations whose pressure tends to close the internal waves having peaks facing the pressure.

Secondly, the internal corrugations, meaning the corrugations that face the pressure will see compressive forces, because the pressure also tends to close both sides of the peak. Obviously, the stiffer the waves are, the more compressive force appears in those peaks. This actually can be a real stopper for membrane to largely deform because the compressive force does not allow the membrane to deform to the top.

Thirdly, it is often a preferred application for the pad to work in an overpressure configuration, in which the membrane will only sense pressure from one side and will only deform in one direction. The top peaks should then have stiffer waves that pressure would open and large and very smooth waves for the bottom peaks to lower as much as possible the compressive forces.

Figure 4:
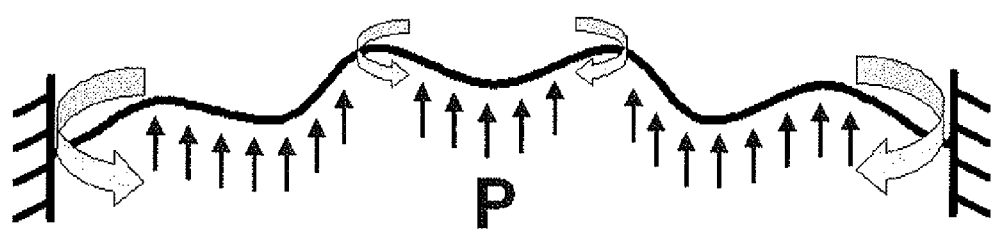
FIG. 4 shows a pressure distribution with higher momentum closer to the attached point.

Fourthly, FIG. 4 shows that the closer on the beam from the attached point, the higher is the momentum created by the applied pressure. The consequence is the membrane should have stiffer waves near the attached points and smoother as we get close to the center.

To sum up, the membrane will need enough corrugations in order to always work in flexion, but not be too stiff for the peaks facing the pressure directions and also smoother as we get to the center. Starting from such a hypothesis, an optimal design of waves in cross section was achieved with help of finite element analysis. This was done for both the TOOL 1 and TOOL 2 pads shown in FIG. 7 and FIG. 8 respectively.

Figure 5:
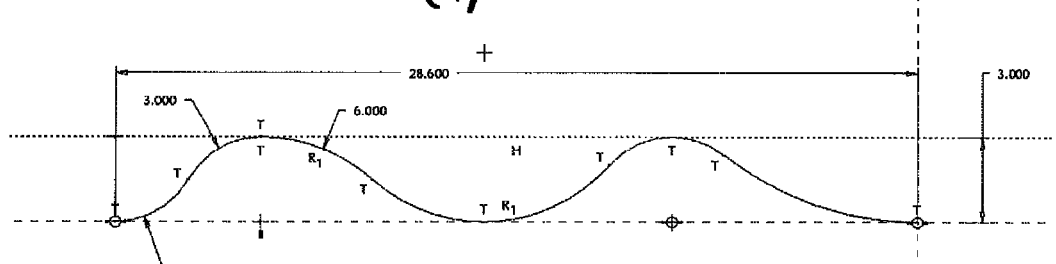
FIG. 5 shows the pad wave profile for two different tool embodiments constructed in accordance with the invention.
Figure 5:
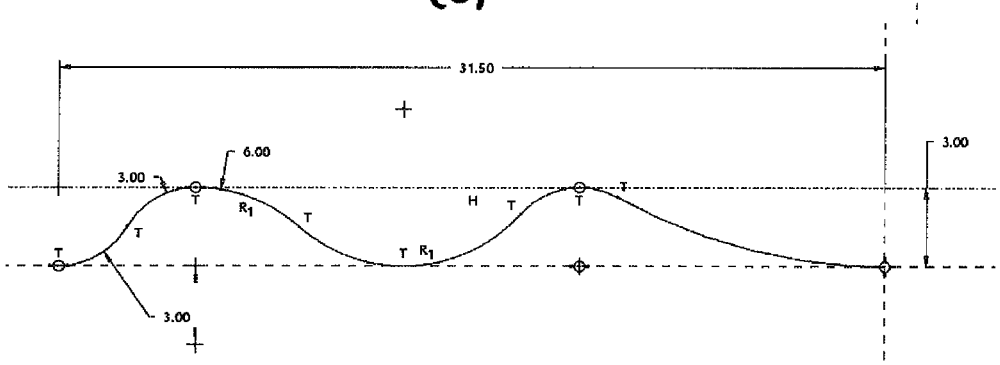

FIG. 5 shows the respective half cross sections for TOOL 1 and TOOL 2 (both are symmetrical and only half of the cross-section is shown on the figures). Although the length varies slightly (28.6 mm on TOOL 2 and 31.5 mm on TOOL 1 pad), the profile is sensibly the same, with the same waves amplitude and the same radius of curvatures, except for the middle one (due to the length difference). The stiffest waves are on the attached points (on the left on both figures) and on the waves in the pressure direction (pressure will be applied on the bottom side of the cross sections shown in the figures), since the waves facing the pressure are smooth.

The two tool membrane examples of TOOL 1 and TOOL 2 will now be explained in more detail followed by a more generic design.

The TOOL 1 pad and pad cover design use two slightly different rectangular surfaces between the pad sensors. The first rectangular surface is 63 mm by 52.6 mm, while the second rectangular surface is 63 mm by 68.8 mm. As those surfaces are close to a square, it is possible to have corrugations in both directions.

This near symmetry in two directions allows use of the whole surface area and achieving an evolutive shape with close to circular waves as shown on FIG. 7. In terms of performance, this membrane allows expansion of the oil volume by up to 14 cc with no plastic deformation and up to 22 cc with a slight plastic deformation and without any local high plastic deformation.

The TOOL 2 pad is very long (488 mm), as its available width is pretty narrow (81.8 mm). By optimizing the cover design, the available area for the membrane is 314.7 mm long and 57.2 mm wide. The consequent discrepancy between the length and the width of the membrane requires having corrugations only into the width of the membrane, since having corrugations also in the length would create local stress concentration points. Finally the design of the cover and membrane, using the corrugations is shown on FIG. 8. In terms of performance, the TOOL 2 membrane allows expansion of the oil volume by 45 cc with no plastic deformation, meaning the membrane comes back to its original shape when differential pressure also comes back to zero. This corresponds to a mean deflection of 2.5 mm in the elastic domain.

TOOL 2 also allows expansion of the oil volume by 70 cc with little plastic deformation, meaning the membrane does not come back to its original shape at zero differential pressure, but there is no sign of local high plastic deformation that would result in possible shearing when cycles in oil expansion are applied.

Notwithstanding the two pad membrane examples provided above, it should be appreciated that the corrugated design may be implemented on any other pad. If the available pad area for the membrane is A=x·y, with x=width and y=length defined by x≤y then corrugations will have the shape as defined in FIG. 8:

The amplitude of the waves is:

$$\frac{y}{40} < A < \frac{y}{5}$$

with ideally $$A = \frac{y}{20}$$

The number of waves will then be defined by:

$$n = \left\lfloor 2 + \frac{y}{10 \cdot A} \right\rfloor$$

with ideally n=4

The first two radius of the first peak starting from the attached point are equal to: r1=r2=A with ideally $$r1 = r2 = \frac{y}{20}$$

The following radius as well as the radius of the peaks pointing toward the pressure main direction, but for the central peak (in the case the central peak is facing down) will be equal to:

$$rb = \frac{24}{n}$$

with ideally $$rb = \frac{y}{10}$$

The radius of the remaining peaks pointing in the pressure main direction, but for the center one (in the case the central peak is facing up) will be equal to: rt=A with ideally $$rt = \frac{y}{20}$$

The radius of the center peak (either facing up or down) is the resulting radius imposed by its tangency in the center of the width.

Figure 6:
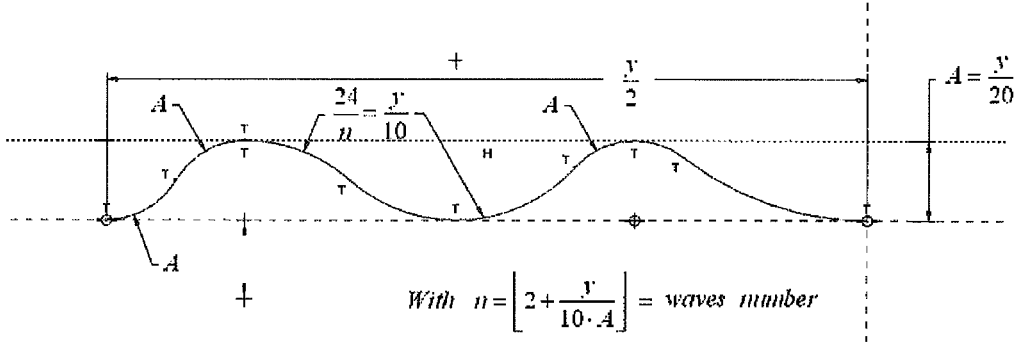
FIG. 6 shows a generic profile on half of a cross-section according to an embodiment of the invention.

FIG. 6 shows a generic wave profile on half of a cross-section. On the left is the attached point that does not move, since the right is the center of the wave. The parameter y is the width of the membrane. All the radii as well as the wave's amplitude may be expressed as a ratio of this width.

Now that the profile of the wave has been defined in cross-section, two cases have to be discriminated so as to define the shape of the waves on the area:
  x≤2·y: the near symmetry allows a similar design as for TOOL 1, meaning an evolutive shape and waves following a track close to a circle. In such a case, the corrugations will be similar to those of FIG. 7.
  x>2·y: the non-symmetry requires a similar design as for TOOL 2, meaning only waved in the width of the membrane. In such a case, the corrugations will be similar to those of FIG. 8.X.

Thus, a preferred embodiment of the innovation uses an elastic metal membrane with corrugations to allow for large deformation in the elastic domain. Optimizing the shape of the corrugations allow for the largest deformations, while still examining the formability of such membrane. Two designs of such membranes are provided for two different existing pads: TOOL 1 and TOOL 2, but can be applied generically.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

What is claimed is:

1. A membrane to compensate for effects on a volume of oil, wherein the membrane comprises a metal having a corrugated shape, wherein the metal is selected to elastically deform when affected by differential pressure across the membrane, such that the membrane is subject to flexion stress and such that the membrane moves with stiffer waves near attached points of the membrane and smoother waves near a center of the membrane, so as to compensate for the effects on the volume of oil.

2. The membrane of claim 1, wherein the effects are pressure and temperature experienced in a downhole environment.

3. The membrane of claim 1, wherein the effects cause the volume of oil to expand or contract.

4. The membrane of claim 1, wherein the metal also has a high yield strength and is easily formable.

5. The membrane of claim 1, wherein the metal is at least one of copper, titanium, nickel, iron, cobalt, zirconium and an alloy containing at least one of the said metals as a main constituent.

6. The membrane of claim 1, wherein the corrugated shape is further selected to maximize a surface area of membrane.

7. The membrane of claim 6, wherein the surface area is obtained from a width and a length parameter of the membrane, and wherein the shape is further selected such that the length and width parameters are of substantially the same order of magnitude.

8. The membrane of claim 1, wherein the shape is selected to only have flexion constraints in its cross section when differential pressure is applied.

9. The membrane of claim 1, wherein the volume of oil is stored in a pad of a downhole tool.

10. The membrane of claim 9, wherein the pad having sensors located therein and surrounded by the volume of oil.

* * * * *